UNITED STATES PATENT OFFICE.

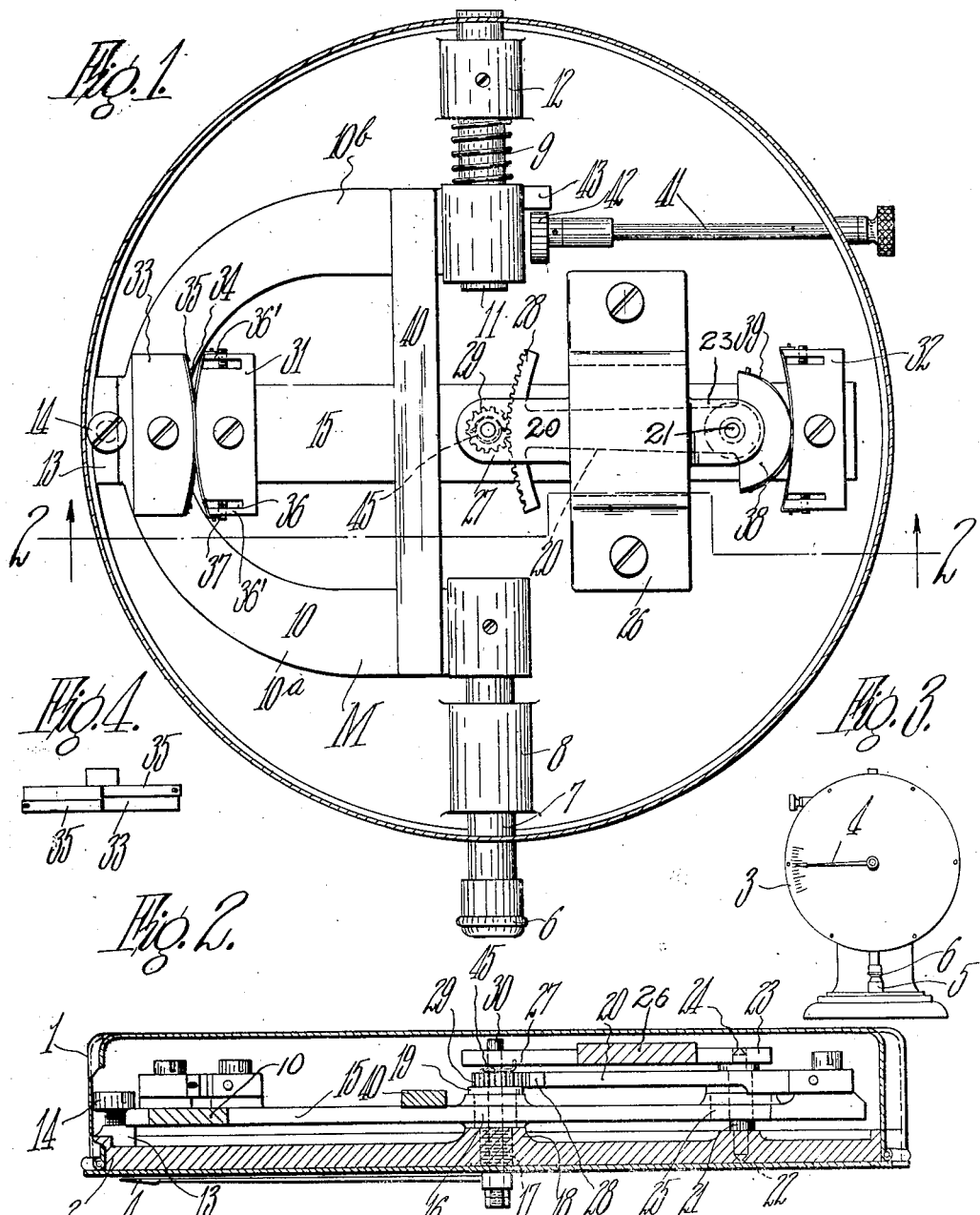

HENRY B. BARTLETT, OF HOLYOKE, MASSACHUSETTS, ASSIGNOR TO B. F. PERKINS & SON, INC., OF HOLYOKE, MASSACHUSETTS, A CORPORATION OF MASSACHUSETTS.

THICKNESS-GAGE.

1,350,769.

Specification of Letters Patent.   Patented Aug. 24, 1920.

Application filed March 20, 1919. Serial No. 283,772.

*To all whom it may concern:*

Be it known that I, HENRY B. BARTLETT, a citizen of the United States of America, and residing at Holyoke, in the county of Hampden and State of Massachusetts, have invented certain new and useful Improvements in Thickness-Gages, of which the following is a specification.

This invention relates to measuring instruments and more particularly to a thickness gage.

One object of the invention is to provide in a thickness gage improved operating mechanism which is strong, simple in construction, and yet accurate, and adapted for low cost production.

Another object of the invention is to provide in a measuring instrument, involving a lever and a movable member actuated by or from it, an improved connecting means between the lever and member characterized by the use of two flexible connecting devices to connect the lever and member for rolling one upon the other without lost motion.

Another object is to provide in a thickness gage an improved disposition of parts, the arrangement being characterized by compactness of the moving elements of the gage within the casing of the latter.

To these ends, and also to improve generally upon devices of the character indicated, the invention consists in the following matters hereinafter described and claimed.

Without restricting the invention thereto, it will be described with reference to the device illustrated in the accompanying drawings and embodying it.

In the drawings—

Figure 1 is an elevational view from the rear, the back of the casing being omitted the better to show the mechanism, and the parts being in zero position as placed when the contact element is in contact with the anvil;

Fig. 2 is a sectional plan view, taken substantially on line 2—2 of Fig. 1, but with the back of the casing shown;

Fig. 3 is a small scale front elevational view of the complete instrument; and

Fig. 4 is a detail view of parts shown in Fig. 1.

Referring now to the drawings: The gage comprises a casing 1, including a front plate 2 provided with a scale 3 over which plays a pointer 4. The scale is graduated in any desired units to indicate the thickness of such articles as the gage is designed to measure. The gage includes an anvil 5 and a contact element 6, movable to and from the anvil 5. Between these, the article to be measured is placed and the gage includes mechanism, designated generally as M, to connect the contact element 6 with the pointer 4, whereby movements of the element are indicated on scale 3. It is to this mechanism M that my invention more particularly relates.

The element 6 is carried by a stem 7, which is slidably mounted in a sleeve-like bearing 8, provided on plate 2. The element 6 is urged toward the anvil at all times by a spring 9, and this spring is so connected with the element 6 that its expanding force is exerted in the desired axial alinement with the element, and without any interference with the other parts of the mechanism. For this connection, a yoke 10 is provided which is fixed at its lower arm 10ᵃ to the stem 7 and slidably mounted, by way of the sleeve-like end of the arm 10ᵇ, on cylindrical spindle 11 fixed in a bracket 12 on the plate 2 and in alinement with stem 7. The yoke is slidably supported upon a lug 13 fixed on the plate 2, and is held to the lug against any possible wabbling movement, such as might occur because of the stem 7 turning in the sleeve 8 and the bearing of the arm 10ᵇ turning on the spindle 11, by a screw 14 threaded into the lug, the head of which overlies the yoke in the bearing contact therewith as shown (Fig. 2). This arrangement, too, aids in steadying the stem 7. The spring 9 is coiled about the spindle 11 and expands against the bracket 12 and the arm 10ᵇ, being located in alinement with the stem 7.

To transmit the motion of the yoke to the pointer 4, the following mechanism is provided. A lever 15 is pivoted intermediate its ends upon stud 16, threaded into the plate 2 at 17, and is held axially between a boss 18 on plate 2 and the head 19 of the stud. A lever 20, for connecting the lever 15 to the pointer 4, is carried by a pivot pin 21, the lever being attached to the pin and the pin being pivotally mounted, at its lower end (Fig. 2), in the plate at 22 and, at its upper end, in an ear 23 at 24. This pin 21 passes through the hole 25 in the lever 15, which hole is sufficiently large to permit free movement of the lever throughout the desired limits. Also, as shown in Fig. 2, the levers are provided with coöperating bearing surfaces about the pin. The ear 23 is a portion of a bracket 26 which is carried by the plate 2 and is arched over the levers 15 and 20 in non-interfering relation therewith.

The lever 20 carries at one end a segmental gear 28 which meshes with a pinion 29 fixed on a pin 30. This pin 30 extends through the stud 16 (the stud forming a bearing for the pin) and has fixed on its outer end the pointer 4. Thus, when the lever 20 is swung, the pointer will be actuated. At its upper end (Fig. 2), the pin 30 is rotatably mounted in an ear 27 provided on bracket 26.

For connecting the yoke 10 and lever 15 and for connecting the lever 15 and lever 20, an improved strap and block connection is used. The straps and block provide the equivalent of a gear connection but differ from such connection in this,—that they entirely eliminate the lost motion necessarily incident to the use of intermeshing gears. Thus, the lever 15 carries at one end a strap-block 31 and at the other end a similar strap-block 32, both being curved concentrically with the pivot 16 as shown. The yoke 10 carries a strap-block 33, the central portion of which is flat and parallel with the axis of stem 7, for coöperation with the block 31, and straps, as steel-tapes 34, arranged side by side, as shown in Fig. 4, connect the two blocks. These tapes 34 are preferably attached to the blocks, as shown in Fig. 1. That is, one end of one tape is secured, as by a pin 35, to one end of block 33 and its other end is similarly secured to the opposite end of block 31. The other tape is similarly secured at one end to the other end of block 33 and at its other end to the opposite end of block 31. Thus, the two blocks are so connected as to roll on one another, just as if one was a rack and the other a gear, but without the friction incident to the use of gearing and without the lost motion which necessarily results from the clearance between gear teeth. To insure against lost motion as well as to permit adjustment of the yoke relatively to the lever, adjusting means are provided which include an adjusting screw 37 for one end of each tape 35. Near the ends of one block, as 31, slots 36 are provided to form the ends of the blocks into fingers 36'. The screws 37 pass through these fingers, and the ends of tapes 35 are likewise fixed to the fingers. By turning up screws 37, the fingers may be sprung outwardly from block 31 to tighten tapes 35 or allowed to spring inwardly to loosen the tapes if desired.

The lever 20, at that end opposite from the segment gear 28, is provided with a block 38, curved concentrically from its pivot 21 for coöperation with the block 32, and tapes 39 connect these two blocks. As shown, the details of this connection are substantially like those of the connection 33—34—31 just described.

Thus, the movable elements of the operating mechanism are effectively connected to actuate one another with as little friction as possible and without lost motion. The connection of lever 20 and pin 30 is necessarily a gear and pinion connection, if the desired large range of angular movement of pointer 4 is to be had. Nevertheless, lost motion is prevented even in this connection, as by a coil spring 45, which constantly takes up the play between these parts in a now well understood manner.

The leverage ratio of the levers may be, of course, varied to suit desired conditions. As here shown, the arms of the lever 15 are substantially equal, and the arms of the lever 20 and the diameter of the gear 29 are arranged to give a very substantial multiplication between the contact element and the indicator.

Desirably, the yoke 10 is provided with a bridge piece 40 fixed thereon and connecting its arms together. This bridge piece not only lends desired rigidity to the structure, but also (Fig. 2) overlies, and lightly bears upon, the lever 15, whereby it serves to steady the lever and supplements the action of the bearing surfaces of the shoulder 19 and the boss 18.

To manually lift the contact element 6, thereby to facilitate the insertion of the piece to be gaged, a shaft 41, rotatably mounted in the casing and carrying an eccentric 42 is provided, and, upon rotation of the shaft from the position indicated in Fig. 1, the eccentric will engage a lug 43 on the arm 10$^b$, and lift the yoke and, so, the contact element 6.

The yoke arrangement between the element 6 and the spring 9 is considered important and advantageous. By this arrangement, the spring is conveniently placed in alinement with the element 6, and the stem 7 and element 6 are given, in practical effect, a very long steadying bearing, as at 8 and 11, and yet a space is conveniently provided (between the arms of the yoke) for the compact and accessible placing of the mechanism. The use of the tape connections between the levers is considered important as eliminating the lost motion incident to the use of link connections, or other connections of a similar nature. The peculiar relation of the lever 15 and the pivot pin 21 is a further feature. With this arrangement, the pin 21 is properly mounted in the base plate, the lever 20 is mounted directly over the lever 15, for convenience and compactness, and yet there is no interference between the pivot pin and the lever 15. The use of the bridge piece 40 is important in that it not only strengthens the yoke 10, but also permits the bearings 8 and 9 to be widely spaced and also acts to steady the lever 15.

The invention has been disclosed herein, in an embodiment at present preferred, for illustrative purposes, but the scope of the invention is defined by the appended claims rather than by the foregoing description.

What I claim is—

1. In a measuring instrument, a contact element, indicating means, and means for connecting the latter and said element, said connecting means including a slidable arch-like yoke with one end of which said element is associated, a lever pivoted to swing substantially in the plane of movement of the yoke and having one end received within the arch thereof, means connecting such end and yoke for relative rolling movement, and means connecting said lever to the indicating means.

2. In a measuring instrument, in combination, a movable contact element, indicating means, and connecting means for connecting said contact element and said indicating means; such connecting means including a swinging lever, a second lever, a pivot pin for the second lever spaced from the fulcrum of the first lever and projecting into the plane thereof to carry the second lever in adjacent relation with one side of the first lever, means for supporting said pin at the other side of the first lever, the latter having an aperture through which said pin is passed and said aperture being of sufficient diameter to provide for desired swinging of such lever without interference with said pin, means for connecting said levers, means for connecting one lever to the contact element, and means for connecting the other lever to the indicating means.

3. In a measuring instrument, in combination, a contact element, indicating means, means for connecting said element and said indicating means and including a supported member and a lever lying adjacent said member and pivoted to swing substantially in the plane of the latter, means for supporting said member and for preventing movement thereof in a plane at right angles to the plane of movement of the lever, and a member projecting from the first-named member and in bearing contact with the lever, thereby to prevent tilting of said lever upon its pivot.

4. In a measuring instrument, in combination, a contact element, indicating means, means for connecting said element and said indicating means and including a yoke and a lever lying between the arms of said yoke and pivoted to swing substantially in the plane of said arms, means for supporting said yoke and for preventing the movement thereof in a plane at right angles to the plane of movement of the lever, and a member bridging said arms and in bearing contact with said lever, thereby to prevent tilting of said lever upon its pivot.

5. In a measuring instrument, in combination, supporting means, a pair of spaced bearings carried by said means, a stem slidably mounted in one of said bearings and having its outer end arranged for contact with the articles to be measured, a yoke-like member bridging the space between said bearings and connected at one end to the stem and slidably supported at the other end by the other bearing, a lever pivoted to said supporting means and having an end movable between the arms of said yokelike member, and in the plane of movement of said member, a second lever pivoted to said means, a strap-and-block connection between the two levers, indicating means, and operative connections between said second lever and said indicating means, said connections being carried by said supporting means.

6. In a measuring instrument, indicating means, a contact element, and means connecting said means and element, said connecting means including a pivoted lever, a second lever movable in a plane parallel with and adjacent the first lever and pivoted at a distance therefrom, pivots for said levers, a frame in which each pivot is mounted at one end, a member fixed to the frame and bridging both levers and in which the other ends of said pivots are received, the pivot pin of one lever passing through the other lever, and an opening in the latter to permit movement thereof without interference with the last-named pin.

HENRY B. BARTLETT.